(12) United States Patent
Bolas et al.

(10) Patent No.: US 6,389,463 B2
(45) Date of Patent: May 14, 2002

(54) INTERNET RADIO RECEIVER HAVING A ROTARY KNOB FOR SELECTING AUDIO CONTENT PROVIDER DESIGNATIONS AND NEGOTIATING INTERNET ACCESS TO URLS ASSOCIATED WITH THE DESIGNATIONS

(75) Inventors: Mark T. Bolas, Mountain View; Ian E. McDowall, Woodside, both of CA (US)

(73) Assignee: IM Networks, Inc., Mountain View, CA (US)

( * ) Notice: Subject to any disclaimer, the term of this patent is extended or adjusted under 35 U.S.C. 154(b) by 0 days.

(21) Appl. No.: 09/334,846

(22) Filed: Jun. 16, 1999

(51) Int. Cl.[7] ............................................. G06F 15/16
(52) U.S. Cl. ..................... 709/219; 709/217; 709/218; 709/216; 709/227
(58) Field of Search ................................ 709/218, 217, 709/216, 219, 204, 227; 455/466; 348/9; 704/260

(56) References Cited

U.S. PATENT DOCUMENTS

| | | | |
|---|---|---|---|
| 5,142,528 A | 8/1992 | Kobayashi | ................... 370/79 |
| 5,557,541 A | 9/1996 | Schulhof et al. | ........ 364/400.01 |
| 5,572,442 A | 11/1996 | Schulhof et al. | ............ 709/219 |
| 5,629,867 A | 5/1997 | Goldman | ...................... 381/77 |
| 5,726,909 A | 3/1998 | Krikorian | ...................... 700/94 |
| 5,764,906 A * | 6/1998 | Edelstein et al. | ........... 709/219 |
| 5,790,423 A | 8/1998 | Lau et al. | .............. 364/400.01 |
| 5,809,246 A | 9/1998 | Goldman | ............... 395/200.47 |
| 5,828,839 A * | 10/1998 | Moncreiff | ................... 709/204 |
| 5,841,979 A | 11/1998 | Schulhof et al. | ........ 395/200.67 |
| 5,892,536 A | 4/1999 | Logan | .......................... 348/13 |
| 5,922,045 A | 7/1999 | Hanson | ...................... 709/206 |
| 5,926,624 A | 7/1999 | Katz | ....................... 395/200.47 |
| 5,956,681 A * | 9/1999 | Yamakita | ..................... 704/260 |
| 6,005,603 A * | 12/1999 | Falvin | ............................ 348/9 |
| 6,012,086 A * | 1/2000 | Lowell | ........................ 709/218 |
| 6,014,569 A * | 1/2000 | Bottum | ....................... 455/466 |

* cited by examiner

*Primary Examiner*—Le Hien Luu
(74) *Attorney, Agent, or Firm*—K. David Crockett, Esq.; Crockett & Crockett (57) ABSTRACT

An device for receiving streaming audio or other audio sources netcast in analogous fashion to a radio broadcast, said device providing an interface analogous to a radio receiver, eliminating the necessity of an intervening personal computer system.

3 Claims, 4 Drawing Sheets

INTERNET RADIO RECEIVER HAVING A ROTARY KNOB FOR SELECTING AUDIO CONTENT PROVIDER DESIGNATIONS AND NEGOTIATING INTERNET ACCESS TO URLS ASSOCIATED WITH THE DESIGNATIONS

FIELD OF THE INVENTIONS

The inventions below relate the field of internet communications.

BACKGROUND OF THE INVENTIONS

Recently, radiobroadcasters have begun transmitting their audio content over the internet, allowing consumers to listen to radio stations received over the internet and played through computer speakers. For a home user to receive radio station "netcasts" over the internet, the user must have a personal computer, an internet account, browser software such as Internet Explorer® or Netscape Navigator®, an audio processing software "plug-in" capable of processing audio information, and a radio simile graphical interface. The browser software must be purchased and/or downloaded from any one of various browser software companies, such as America Online, Microsoft, or Netscape. The audio processing software must be purchased and downloaded from other companies (Apple Computer's QuickTime® software, RealPlayer's RealAudio®, and Microsoft's Windows Media Player software are examples). Radio simile graphical interface software must be purchased and downloaded from yet another company (Digiband Radio and MacTuner are examples of radio simile interface software). None of the browsers are compatible with all the audio processing software, and none of the audio processing software is compatible with all the radio simile graphical interface software. A typical end user must be extremely lucky to install all the necessary components with proper cross compatibility. The end result, if it can be achieved, is the ability to access a web site sponsored by one of the software suppliers, review a database of radio station web sites maintained by the software supplies, and link to the radio station web site from the database.

SUMMARY

The inventions described below provide devices and method for receiving radio broadcasts over the internet in a device which resembles a typical radio receiver. The hardware is housed in a radio box separate from a personal computer, and the interface is a panel of physical radio knobs, buttons, FM and AM channel indicators, etc., on the radio housing. Inside the radio box, necessary computer components and software permit connection to the internet and communication with various sources of audio information. In one embodiment, the device is a completely stand-alone device which a consumer can plug into a telephone line, ISDN line, local area network, or cable line and select radio stations with the same type of controls as a typical radio. In another embodiment, the device is a box which communicates with the internet through the user's personal computer, which must then have an internet connection and internet software installed and operating.

Aspects of the interface are modeled on broadcast radio receivers. For example, the internet radio presents linear tuning selection, making it natural to "tune" to the "next" or "previous" stations by imposing a linear architecture on web radio stations identifiers. Since most radio listeners select radio stations based on frequency indications on their broadcast radio receivers, a frequency band can be used as station identifiers to impose the linear architecture. However, several broadcasters throughout the world may use the same frequency in different geographical locations (the assignment to frequency bands is regulated to ensure that stations using the same frequency are so far apart that interference is unlikely). Radio stations are generally tied to geographic locations, and they generally broadcast content that is relevant the geographic area. Accordingly, the internet radio may be provided with a selector system for selecting a geographic area for tuning, after which the user can tune to stations based on frequency.

The internet radio provides an easy way to tune to radio stations all over the world, as naturally as a user would tune to local FM and AM stations. A listener in New York might want to hear a Tokyo based morning show over breakfast (in New York), so it is advantageous to provide a system for delaying broadcast reception several hours. This can be done in a specialized internet server which stores the data and sends it out again at a later time. Different users could request different streams of the same original source but which were delayed by different amounts.

DETAILED DESCRIPTION OF THE INVENTIONS

Figure 1:
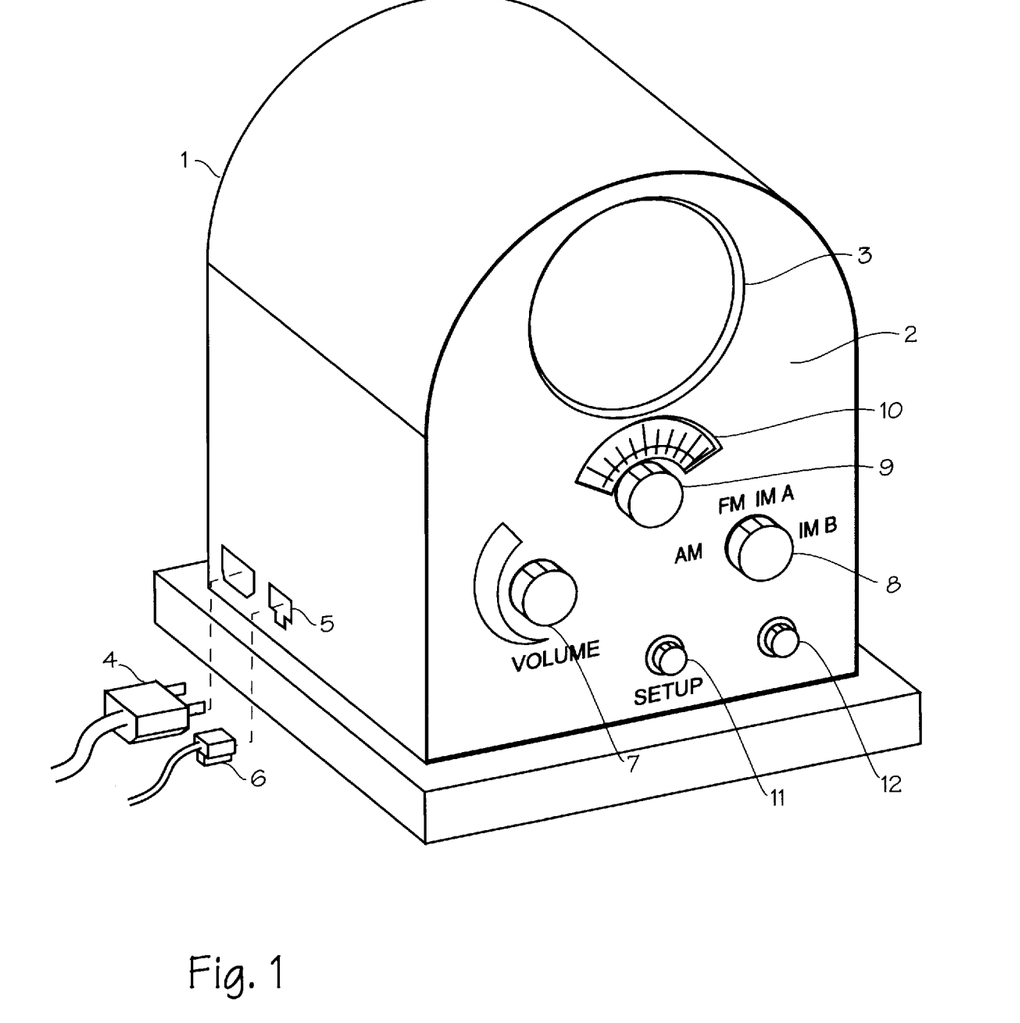
FIG. 1 shows a stand-alone embodiment internet radio.

FIG. 1 shows a stand-alone embodiment internet radio. The radio box 1 is provided as a shell for housing all the components used by the user. The box includes a control panel 2, a speaker 3, a power cord 4 (though the device may be battery powered, if desired) and a telephone jack 5 and associated telephone cord 6. On the control panel, a volume selector 7 which can be manipulated to increase and decrease volume (the volume selector is provided in the form of a rotating knob, but may be provided in various other forms). Band selector 8 is provided to allow a user to select amongst AM radio, FM radio stations and other radio frequency bands or "virtual bands" (IM A and IM B) that the system ascribes to internet only audio sources (the ascription of virtual bands to net-only audio sources may be done arbitrarily within the system, or may be done through consensus amongst net-only netcasters). The band selector may be provided in the form of a rotary knob, scroll pushbutton, multiple pushbuttons or other configurations. A "frequency selector" or tuning knob 9 is provided to allow a user to select netcasters by selecting a frequency designation, much as a user would use a tuning selector on a radio or receiver, or by selecting from net stations organized as a linear list. The tuning knob can be provided in the form of a rotary knob, scroll pushbutton, a scan pushbutton, multiple pushbuttons or other configurations. The radio box also includes at least one display 10 for indicating current user selections. If an old fashion radio display is desired, the displays may be incorporated into the selector knobs/control panel structure, for example a pointer on the band selector combined with written labels on the underlying panels, as shown. If a modern electronic interface is desired (which will also easier accommodate use of net-only bands and emergent bands created after construction of the radio box), the display is preferably a digital display (shown in FIG. 2) which can display a readout of the frequency band, frequency, geographic area selected by the user, and perhaps also display the volume, balance and tone as adjusted by the user. A setup control button 11 may be provided to permit the user to direct the internet radio to run through a set-up procedure in which determines needed internet connection information such as local access telephone number, user name and password, and local ISP protocols. Alternatively, the setup may initiate an automatic configuration using a DHCP protocol or the like. Finally, an on/off switch 12 is provided to turn the device on and off.

Alternative configurations can be devised to match any users listening preferences and pre-existing home audio/ home theater systems. Speaker cable connections may be provided so that the device can be connected to higher quality audio speakers of the users choice (the speaker can be disposed of if the end-product is to be provided as a receiver, in which case the box can be provided with speaker connections or audio output jacks for further connection to an audio amplifier or home theater amplifier/receiver). The telephone jack and cord comprise an internet connection line that might be comprised instead of a network interface card, cable television cable, an ISDN line, a cellular phone jack or complete cellular phone, or any other means for connecting to the internet. Additional audio controls, such a treble and bass adjustment, balance adjustments, bass boost, etc. may also be added to the control panel.

Figure 2:
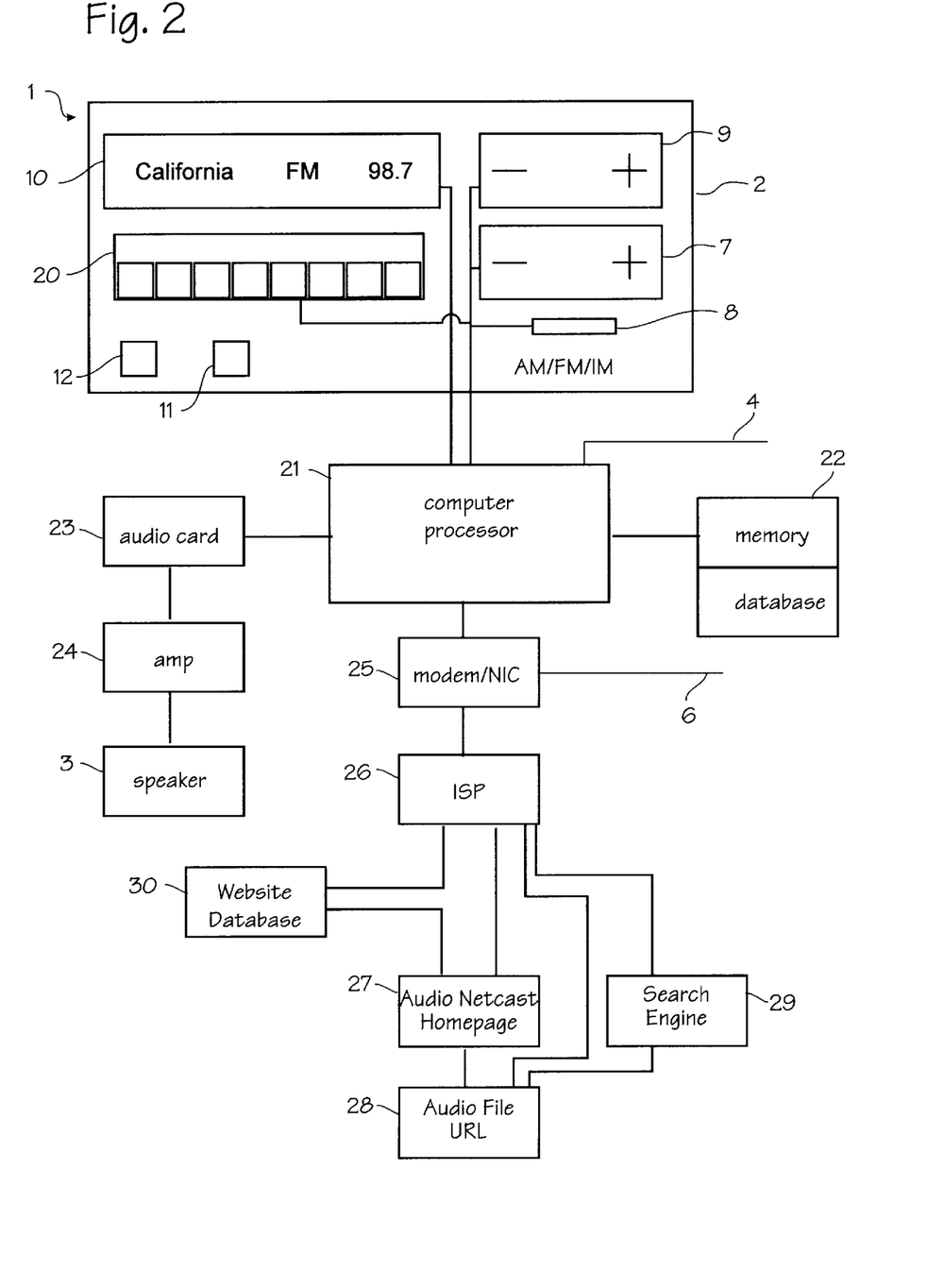
FIG. 2 is a block diagram of the stand-alone embodiment of the internet radio.

FIG. 2 is a block diagram of the stand-alone embodiment of the internet radio. The radio box 1 includes the control panel 2 with controls mentioned above, such as volume control 7, band selector 8, tuning selector 9, and display 10. The radio box also includes the speaker 3 (which instead might be replaced by speaker jacks or a line level output to a separate high fidelity amplifier). The radio box is connected to household current through power cord 4, and connected to household telephone wiring through telephone cord 6. An alpha-numeric input device 20 comprises a touchpad, pushbutton array or the like to input basic user-related system information during the configuration process (a telephone pad input system, common to cellular telephones, may be used). This input device can also serve as a set of pushbutton preset switches which may be used to select preset audio source selections during normal use. The electronics for connecting to the internet and communicating through the internet with audio sources includes a computer processor 21, computer memory 22, an audio card 23, an audio amplifier circuit 24 and a modem card 25 (the modem card may be replaced by a network interface card, cable modem, ISDN modem or the like). The computer processor is programmed with a minimal operating system and software or firmware required to operate the modem, manage network protocols to communicate with the ISP, web sites, streaming audio sources, etc., (and handle all negotiation with internet side modules), receive and respond to user inputs from the control panel, and process received data to send to the display 10 and audio card 23. The computer memory 22 is used by the computer processor to store information, such as user presets, a database of web site addresses (and operating software and internet software if this is not provided in firmware with the computer processor), and local digital sound recordings. The memory may be provided in the form of hard disks, floppy disks, minidisks, flash memory, memory sticks, RAM or any other form of memory. The audio card 23 receives data from the computer processor (or direct from memory) and translates it into audio signals which are then transmitted to the audio amplifier 24 and then to the speakers which then translate the audio signal and annunciate sound and provide the desired audible output. The modem card 25 processes data signals which are created in the computer processor for communication to internet web sites or processing centers through the telephone line, and process data signals from the internet which are transmitted to the radio box through the telephone line. The expected data transmitted from the computer processor to the internet websites/processing centers comprises requests for access to specific URL's, requests for specific audio sources from a database of audio sources maintained at a system website, searches for audio sources, and communication of some information regarding the specific user's internet radio to a web site. The desired data transmitted from the internet to the user's internet radio is the audio content from an audio source. This desired data will be accompanied by other data, such as an identification of the audio source or website, the audio data protocol or format, and other information used by the computer processor to process the audio information. The audio data is expected to be in a standard format (although several "standards" are currently in competitive use). The computer processor is programmed with one or more programs for translating the standard data formats for audio information into audio signals acceptable to the audio card.

On the internet side, as shown in FIG. 2, the internet components with which the internet radio interacts are illustrated. The radio must connect to the internet through a host, such as internet service provider (ISP) 26. The ISP serves to connect many internet users to the internet, and passes all the data between the internet radio and the various websites. Audio content netcaster website homepages 27 (of which there are currently thousands) transmit or stream audio information, upon request, to many internet users simultaneously. The audio files are provided through an audio file server 28 "behind" the homepage, with a separate URL. Various search engine websites 29 exist on the web, and maybe accessed to search for audio content websites. A system management website 30 provides management services to the community of internet radio users, such as maintenance of a content provider database, audio file servers associated with content providers, management of advertising content interjection, firmware/software updates, and initial configuration management.

In normal use, internet radio users will merely turn the radio on and select a radio band (AM, FM, or NetM), select a station by associated frequency, call sign, or web address or other arbitrary designation. When preset buttons are enabled and programmed, the user can select any preset "station" or audio source by pressing a preset button. The internet radio will dial the user's ISP, sign onto the users internet service, and negotiate with the ISP to link to the URL or web site address of the desired audio content netcaster or link to the URL or web site address of the associated audio file server.

For initial use, it is preferable that the stand-alone version of the internet radio require as little configuration as possible. Thus, the internet radio is programmed with software which, upon first use or in response to a request to configure (which can be entered in numerous manipulations of the input knobs), will:

(1) Dial-up server-based walk through: operate the modem to connect to a stored telephone number and to a system management server operated by the proprietors of the internet radio system, and upon connection the system management server will communicate with the individual internet radio (as if it were a "client node") to download a database of audio content provider URLs, query the user (through the display panel) as to their ISP identity, ISP local telephone number, username and password. If necessary, the system management server will download any software/firmware updates and audio processing plug-ins to the user's internet radio; or (2) Front panel configuration: operate the display and memory to query the user (through the display panel) as to their ISP identity, ISP local telephone number, username and password; and optionally initiate a call to the internet and communication with the system management server and negotiate a download of current database of audio content provider URLs; or (3) Nation-wide provider setup: operate the modem to connect to a telephone number of a nation-wide or area-wide ISP company (such as CompuServe or AOL), to obtain local telephone access numbers, and walk through setup with entry of ISP screen names and passwords through the keypad in response to prompts from the nation-wide or area-wide ISP company; or (4) Personal telephone call with a system customer representative, where the user communicates location, ISP information, screen name and password to the customer representative; the customer representative can then walk through configuration with the user, or enter configuration data into system management server, whereupon the internet radio can dial-up system management server directly and negotiate automatically with the system management server to configure the internet radio with the data provided to the customer service representative (the data can also be provided to the system management server by the user using their own personal computer and web browser).

Figure 3:
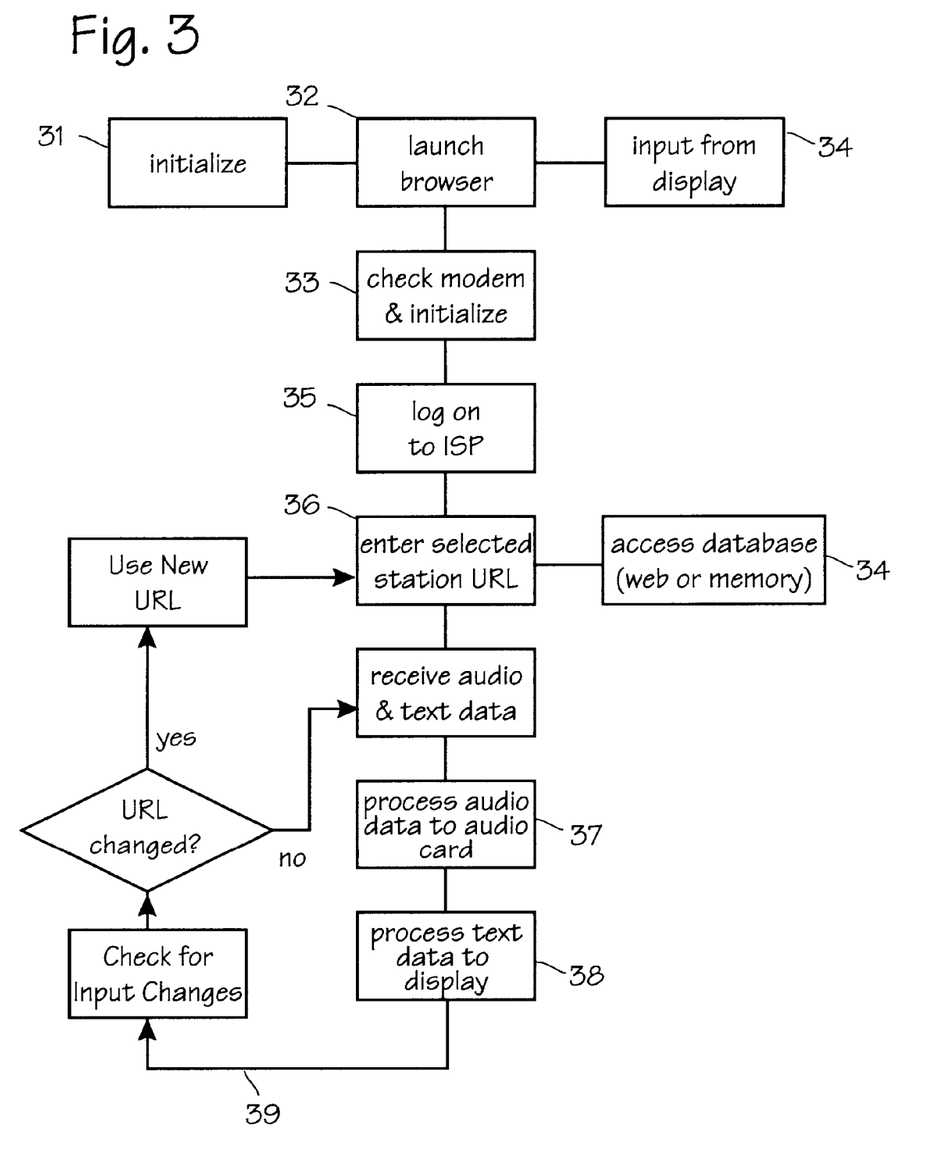
FIG. 3 is a flow chart of the software necessary to operate the internet radio system.

The software necessary to operate the internet radio system is illustrated in flow chart form in FIG. 3. Upon system startup (preferably accomplished by turning the radio on using the power button), the system software loads (block 31). Since the device has a single purpose, the application software can be immediately launched upon startup (block 32) and in fact can be combined with the system software. The system/application software initializes the modem, checking for dial tone (or other expected signal from the internet connection) and proper response from the modem (block 33), and checks for input from the user interface (block 34), such as the desired band and station. The software logs onto the user's ISP (block 35), negotiating with the user's ISP to enter screen name and password, wait for the opening screen or ISP homepage. If the system is designed to use an audio content provider database which is stored in the internet radio's own memory, the content retrieval module of the software (block 36) looks up the URL corresponding to the desired station (which may be stored in on board memory or on the system management server) and then enters the desired audio content URL (i.e., the web address) in the ISP homepage. If the system is designed to depend on the system management server, then the content retrieval module of the software (block 36) enters the system management server address, awaits connection with the system management server homepage and enters the desired station identifier into the system management server. The system management server then looks up the web address for the desired station, and negotiates with the audio content provider website to arrange transmission of audio data to the user's internet radio. Upon receipt of the audio data, the data processing module (block 37) processes the audio data received and causes that data to be transmitted to the audio card, for eventual transmission to the speakers. The data processing module also processes any accompanying identifying data (block 38), and causes that identifying text data to be sent to the display. The system thereafter merely passes audio information through to the radio speakers, until the user turns off the radio or changes the station. When the station is changed, the software steps through the process of finding the web address corresponding to the desired audio content provider and negotiating with internet websites to arrange transmission of audio signals from the audio content provider to the internet radio (loop 39).

As programmed, the software takes input from the control panel knobs and/or pushbuttons or other input devices, and negotiates with the internet to receive a stream of audio data from the URL associated with the user's selection on the knobs or buttons. The net radio sends requests using the knob (and other) data translated into requests to a URL which is redirected by a server. For example, let's assume we have a user "iowajoe" who owns net radio with serial number 98678 who is turning the knob—here are examples of the kinds of requests which could be sent by the radio to the server (the server being designated by the web site names netradiostation.com in this example).

Turning the knob to various positions such as 123, 124, 125, and 126 (arbitrary station designations set by the system or by the user for CIBL in Canada, BBC in England, an audio book source, and a headline news source, respectively), would send the following requests:

http://www.netradiostation.com/stations/iband?knob=123&user=iowajoe&serialno=98678 http://www.netradiostation.com/stations/iband?knob=124&user=iowajoe&serialno=98678 http://www.netradiostation.com/stations/iband?knob=125&user=iowajoe&serialno=98678 http://www.netradiostation.com/stations/iband?knob=126&user=iowajoe&serialno=98678

On the netradiostation server side (this is pseudo code), the system will receive and act upon input from the user's internet radio box as follows:

```
If (user == iowajoe)
    ...
    If(knob == 123)
        Serve audio stream of an add or brand name blue jeans
        Connect to CIBL station in Canada at http://www.cibl.cam.org/live.ram
    If (knob == 124)
        Serve audio stream of locally stored headlines from BBC News
        Redirect to live feed from BBC News to join the program in progress
```

```
        If(knob == 125)
            Serve audio stream for today's chapter of audio book of the week
        If(knob == 26)
            Find user in user database and locate city
            Redirect to audio stream for user's local weather based on city information
            Serve audio stream for user's local advertisement of Bageltown on Main Street
            Redirect to audio stream for People Magazine headlines
            Redirect to audio stream for Sports Headlines
            Serve audio stream from text to voice converter of sports scores based on user
interest
                in Hockey, and the local high school Wildcats team
            Redirect to ad for the Gap at http://www.gap.com/audio/add?
                local=iowacity&user=male
            Redirect to audio stream for 40's swing at
http://www.newcastle.edu.au/fm 104.ram
        If(Knob==127)
            Redirect to http://www...
```

The netradiostation server uses the tuning knob and user parameters to index into a list of station URLs from which the radio audio data will be actually served. During that redirection process, the netradiostation server may provide some content while the other site is being connected to and the stream initialized. Thus, when the user turns the control panel knobs to select station 123, the system negotiates a connection to the CIBL radio station's audio stream. While the system is negotiating, the system management server can feed an advertising audio stream to fill otherwise dead "air" time.

When the knob is on number 124, the stored audio stream for the BBC headlines is served from the system management server (netradiostation) server while the system negotiates a connection with the BBC "live" audio stream feed. As the stored audio stream draws to a close, the connection to the live BBC feed is initiated.

In the system operation illustrated in relation to arbitrary channel designation 126, the user has stored a number of URL's for various audio sources, such as local weather, sports headlines, gossip headlines, etc. The system management server redirects the inquiry accordingly, on the basis of the knob and user data provided in the request.

Figure 4:
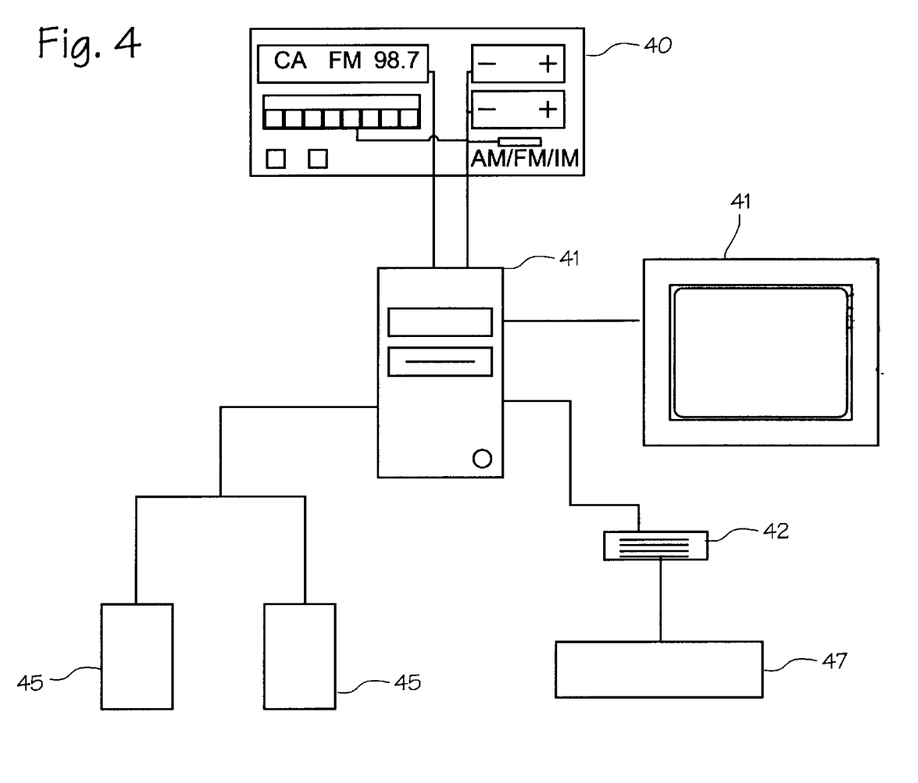
FIG. 4 shows a block diagram of an internet radio designed for use with a personal computer.

FIG. 4 shows a block diagram of an internet radio designed for use with a personal computer. The radio box 40 is supplied as a peripheral device for the personal computer system 41, to be connected with the USB, SCSI, serial or other communications protocol and appropriate connector 42. The radio box 40 in this embodiment contains circuitry and computer processor sufficient to create the radio-like interface. The remaining components are supplied in the personal computer system, which includes the processor 43, the monitor 44, speakers 45 and modem 46 which connects the computer system to the internet 47. The software package for controlling the radio and responding to the user manipulation of the radio controls can be incorporated into a software program stored in the processor 42, as a driver or plug-in to popular browser software such as Netscape Navigator® or Internet Explorer®, and can incorporate various audio plug-ins for those browsers, such a RealAudio® or QuickTime® streaming audio software. The internet radio plug-in software provides the computer system with the capability of (1) receiving input from the radio box tuning selector 9, volume control 7, band selection control 8, (2) transmitting display text to the display (if provided, as in FIG. 2), (3) processing audio data for transmission to the speakers through operation of the streaming audio software. In operation, the user selects a desired streaming audio source by selecting it with the controls on the radio box, selecting the geographic origin of the desired audio source, the band of the desired audio source, and the frequency of the desired audio source (for radio stations) or other designation (for internet only audio sources).

The internet radio described employs a linear tuning band for station selection. This linear approach means that the order in which stations are visited when adjusting the tuning is fixed. This provides the software with the ability to pre-fetch audio from the "next" or "previous" URLs in the list. As a result, when the tuning is adjusted, the internet radio does not have to initiate a connection to the new station from scratch and may in fact already have a connection initiated and some (perhaps low quality) audio buffered in anticipation of an adjustment in tuning. This will reduce the apparent dead time when changing net radio stations.

When changing stations, the internet radio may fill the time to initiate the playing of the audio stream from either special a clip on a server which is a few hops away or from local storage in the device. These audio sources could contain advertising, station identification, or other audio to be played while the connection with the desired URL is initiated.

The tuning process we have described is based on a linear list of net radio stations. There is no reason to only create one NetM band—it may be advantageous to define a number of different bands which each have different characteristics such as local, international, jazz, etc.

In addition to a set of linear bands, the bands may be organized as a tree of bands. In this organization, there is a top level band which contains a number of other bands and so on. For example the top level band (which may be customized by the user) might look like this:

<KCBS Local News Station> <Jazz Stations> <International>. . . Selecting <KCBS Local News Station> plays the local news on KCBS. Selecting <Jazz Stations> presents a new band of Jazz Stations: such as <WBGO NJ> <WFSJ FL> <WJZW Smooth Jazz DC> <WPFW DC>. . . <Jazz in Europe>. . . . Selecting <Jazz in Europe> brings up a new band which includes stations of Jazz in Europe and perhaps other bands which present different orderings of the band itself. Thus, <Jazz in Europe> might have European jazz stations listed alphabetically by call letters but also have bands such as <Jazz in Germany> which contain just German European jazz stations.

On the control panel 2, a display is shown which indicates the current station being played. An alternative to this visual display would be for the internet radio to provide audio cues for station identification, and during the tuning process. For example, as one changes stations on the Jazz dial, the internet radio can play a brief clip with a station identifier as one roamed across the band.

The internet radio can be provided with a host of ancillary capabilities. It can be provided with digital signal processing capability to improve the perceived sound quality of the presentation. An audio input capability (either analog or from stored media) can be provided to allow the user to transmit audio data over the net, creating an audio netcast site. The internet radio can also be manufactured in modular form, with a circuit card being fashioned along with a complementary stereo receiver, boom box, car radio or the like. The circuit card housing the computer processor, modem, and input and output connectors can be supplied as a component to be install in such systems in original equipment manufacture, or as an after market upgrade for systems designed with necessary connectors and installation space to accommodate and after market upgrade. Although the term radio has been used by analogy, the device can more generally be considered as an audio content receiving device.

While the invention has thus far been described in terms of receiving audio content, and in particular the netcasts of current radio broadcasters, the invention may readily be used to receive video content should television or cable video content providers chose to netcast video content. In this case, the current world wide web interface which is now used to download relatively small video files may be replaced with a television-like interface, in which a monitor and speaker combination is provided with user input controls as described above, including (1) geographic origin selector, (2) band selector (i.e., broadcast or netcast only), and (3) channel selector, which are used by the viewer to select video content without resort to a personal computer and navigation through the architecture of the world wide web.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A method for receiving and playing audio content from an internet audio content provider capable of streaming audio to internet users, said method comprising:
   providing an audio content receiving device for receiving and playing audio content from an internet based audio content provider, said audio content receiving device comprising
      an enclosure housing a internet connection device, computer processor, computer memory, and an audio card, said enclosure having a control panel disposed on the exterior of the enclosure;
      an audio speaker operably connected to receive output from the audio card and annunciate the audio output;
      an input device on said control panel for indicating a selected audio content provider for access by the device by input of a content provider designation;
      said computer memory storing a database of designated audio content provider designations and URL's associated with each audio content provider designation;
      said computer processor being programmed to connect with the internet through the internet connection device, to receive input of an audio content provider designation from the input device, interpret the input from the input device as a selection of a desired audio content provider, to look up from the memory the URL associated with the desired audio content provider, and negotiate with the internet to access the URL associated with the desired audio content provider and accept audio information from the URL for playback through the audio speakers;
   providing a plurality of audio content providers on the internet accessible to the audio content receiving device through the internet, said internet server being programmed to respond to requests for audio content by streaming audio content to the audio content receiving device;
   connecting to the internet with the audio content receiving device, accessing a particular audio content provider amongst the plurality of audio content providers based upon the users manipulation of the input device;
   wherein the input device is a rotary knob, combined with a display capable of displaying audio content provider designations, and said rotary knob is operable by the user to cause display of various audio content provider designations on the display and direct the device to negotiate access with the associated audio content provider.

2. A device for receiving and playing audio content from an internet based audio content provider comprising:
   an enclosure housing a internet connection device, computer processor, computer memory, and an audio card, said enclosure having a control panel disposed on the exterior of the enclosure;
   an audio speaker operably connected to receive output from the audio card and annunciate the audio output;
   a first input device on said control panel for indicating a selected audio content provider for access by the device by input of a content provider designation;
   said computer memory storing a database of designated audio content provider designations and URL's associated with each audio content provider designation;
   said computer processor being programmed to connect with the internet through the internet connection device, to receive input of an audio content provider designation from the input device, interpret the input from the input device as a selection of a desired audio content provider, to look up from the memory the URL associated with the desired audio content provider, and negotiate with the internet to access the URL associated with the desired audio content provider and accept audio information from the URL for playback through the audio speakers;
   wherein the input device is a rotary knob, combined with a display capable of displaying audio content provider designations, and said rotary knob is operable by the user to cause display of various audio content provider designations on the display and direct the device to negotiate access with the associated audio content provider.

3. A system for receiving and playing audio content from an internet audio content provider capable of streaming audio to internet users, said system comprising:
   an audio content receiving device for receiving and playing audio content from an internet based audio content provider
      an enclosure housing a internet connection device, computer processor, computer memory, and an audio card, said enclosure having a control panel disposed on the exterior of the enclosure;

an audio speaker operably connected to receive output from the audio card and annunciate the audio output;

an input device on said control panel for indicating at selected audio content provider for access by the device by input of a content provider designation;

said computer memory storing a database of designated audio content provider designations and URL's associated with each audio content provider designation;

said computer processor being programmed to connect with the internet through the Internet connection device, to receive input of an audio content provider designation from the input device, interpret the input from the input device as a selection of a desired audio content provider, to look up from the memory the URL associated with the desired audio content provider, and negotiate with the internet to access the URL associated with the desired audio content provider and accept audio information from the URL for playback through the audio speakers.

an internet server accessible to the audio content receiving device through the internet, said internet server being programmed to respond to requests for audio content by streaming audio content to the audio content receiving device;

wherein the input device is a rotary knob, combined with a display capable of displaying audio content provider designations, and said rotary knob is operable by the user to cause display of various audio content provider designations on the display and direct the device to negotiate access with the associated audio content provider.

* * * * *